Patented Apr. 7, 1953

2,634,275

UNITED STATES PATENT OFFICE 2,634,275

4-ACYLAMINO-1-ALKYL-4-PHENYLPIPERIDINES AND METHOD OF MAKING SAME

Charles E. Kwartler, Albany, N. Y., and Philip Lucas, Watertown, Mass., assignors to Winthrop-Stearns Inc., New York, N. Y., a corporation of Delaware No Drawing. Application November 7, 1951, Serial No. 255,326

9 Claims. (Cl. 260—294)

1

This invention relates to new piperidine compounds and to their preparation. In particular, said piperidine compounds are lower carboxylic acyl derivatives of 4-amino-1-(lower alkyl)-4-phenylpiperidines and acid addition salts thereof.

The compounds of this invention have been found to possess useful pharmacological properties, such as analgesic activity.

The basic compounds, 4-acylamino-1-(lower alkyl)-4-phenylpiperidines, having the formula

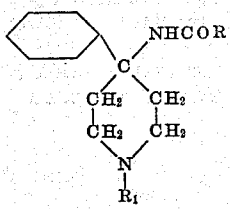

where R is a lower alkyl radical having preferably from 1 to 5 carbon atoms inclusive and $R_1$ is a lower alkyl radical having preferably from 1 to 6 carbon atoms inclusive, are prepared by treating a 4-amino-1-(lower alkyl)-4-phenylpiperidine with an acylating agent, such as a lower aliphatic carboxylic acyl halide or a lower aliphatic carboxylic acid anhydride. An illustration of this preparation is the formation of 4-acetylamino-1-methyl-4-phenylpiperidine by treating 4-amino-1-methyl-4-phenylpiperidine with acetyl chloride or acetic anhydride.

The intermediate 4-amino-1-(lower alkyl)-4-phenylpiperidines are formed by subjecting the corresponding 1-(lower alkyl)-4-phenylpiperidine-4-carboxamides to a Hofmann degradation reaction, i. e., by treating said amide with sodium hypobromite or sodium hypochlorite. Thus, in such a manner 4-amino-1-methyl-4-phenylpiperidine is formed from 1-methyl-4-phenylpiperidine-4-carboxamide.

The salts of our invention are prepared by treating the 4-acylamino-1-(lower alkyl)-4-phenylpiperidines with the appropriate acid. In practicing our invention, we found it convenient to employ the hydrochloride salts. However, other salts are within the scope of the invention. Included among other salts which may be used are the following, formed by reacting the basic piperidine compound with the appropriate relatively non-toxic inorganic or organic acid: the hydrobromide, hydroiodide, phosphate, sulfate, sulfamate, ethanesulfonate, tartrate, citrate, succinate, acetate, benzoate, oleate, and the like.

The following examples will further illustrate specific embodiments of our invention.

2

Examples

*4-amino-1-methyl-4-phenylpiperidine.*—To a mixture of 180 ml. of 35% aqueous sodium hydroxide solution and 360 ml. of water was added at 0° C. 30.3 ml. of bromine. To this solution, kept at 0° C., was added 107 g. of 1-methyl-4-phenylpiperidine-4-carboxamide. The temperature of the reaction mixture was allowed to rise, whereupon an almost clear solution resulted at about 50° C. The reaction was then heated on a steam bath for about twenty minutes and was then allowed to cool. The cooled reaction mixture was saturated with potassium carbonate and extracted with acetone. The acetone extract was dried with anhydrous calcium sulfate and the solvent was removed by distilling in vacuo, and the resulting residual material was distilled in vacuo, a fraction of 53.5 g. of material being collected at 97° C. and 0.3 mm. This water-white liquid, which colored slightly on standing, is 4-amino-1-methyl-4-phenylpiperidine.

Following the foregoing procedure but using 1-ethyl-4-phenylpiperidine-4-carboxamide, 1-isobutyl-4-phenylpiperidine-4-carboxamide or 1-n-hexyl-4-phenylpiperidine-4-carboxamide in place of 1-methyl-4-phenylpiperidine-4-carboxamide, there is obtained 4-amino-1-ethyl-4-phenylpiperidine, 4-amino-1-isobutyl-4-phenylpiperidine or 4-amino-1-n-hexyl-4-phenylpiperidine, respectively.

*4-amino-1-methyl-4-phenylpiperidine dihydrochloride.*—A solution of 25 g. of 4-amino-1-methyl-4-phenylpiperidine dissolved in acetone was treated with a solution of hydrogen chloride in ethanol, giving a white precipitate. This precipitate was recrystallized once from isopropanol with charcoaling, once from ethanol with charcoaling, and then finally from ethanol. The resulting product, 4-amino-1-methyl-4-phenylpiperidine dihydrochloride, when dried in vacuo at 100° C. for eight hours and then at room temperature for twenty hours over phosphorus pentoxide, melted at 198–200° C. (turning glassy).

Anal. calcd. for $C_{12}H_{18}N_2 \cdot 2HCl$: C, 54.75; H, 7.61; Cl, 27.00.

Found: C, 54.82; H, 7.77; Cl. 26.64.

Following the above procedure but using 4-amino-1-ethyl-4-phenylpiperidine, 4-amino-1-isobutyl-4-phenylpiperidine or 4-amino-1-n-hexyl-4-phenylpiperidine in place of 4-amino-1-methyl-4-phenylpiperidine, there is obtained, respectively, 4-amino-1-ethyl-4-phenylpiperidine dihydrochloride, 4-amino-1-isobutyl-4-phenylpiperidine dihydrochloride or 4 - amino - 1 - n-hexyl-4-phenylpiperidine dihydrochloride.

*4 - acetylamino - 1 - methyl-4-phenylpiperidine hydrochloride.*—A solution of 23 g. of 4-amino-1-methyl-4-phenylpiperidine dissolved in 50 ml. of benzene was treated with a solution of 10 ml. of acetyl chloride in 50 ml. of benzene. This mixture was refluxed on a steam bath with stirring for thirty minutes, cooled, diluted with ether and the resulting precipitate was collected. This precipitate was recrystallized several times from isopropanol with charcoaling, yielding a product which melted at 153–155° C. This product, 4-acetylamino-1-methyl-4-phenylpiperidine, in the form of its hydrochloride, analyzed as follows after being dried in vacuo at 100° C.

Anal. calcd. for $C_{10}H_{20}N_2O \cdot HCl$: N, 10.39; Cl, 13.18.
Found: N, 10.17; Cl, 12.75; moisture, 1.76.
Found (on dry basis): N, 10.33; Cl, 12.99.

4 - acetylamino - 1 - methyl - 4 - phenylpiperidine, in free base form, is obtained by treating an aqueous solution of its hydrochloride with ammonium hydroxide, collecting the precipitate, washing it with water and drying it.

When the above procedure is followed but using in place of 4-amino-1-methyl-4-phenylpiperidine and acetyl chloride, 4-amino-1-ethyl-4-phenylpiperidine and n-caproyl chloride, 4-amino-1-isobutyl - 4 - phenylpiperidine and isobutyryl chloride or 4-amino-1-n-hexyl-4-phenylpiperidine and propionyl chloride, there is obtained, in the form of their hydrochlorides, 4-n-caproylamino-1-ethyl-4-phenylpiperidine, 4-isobutyrylamino-1-isobutyl-4-phenylpiperidine or 4-propionylamino-1-n-hexyl - 4 - phenylpiperidine, respectively.

When the above procedure is followed but using an equivalent quantity of acetic anhydride in place of acetyl chloride, 4-acetylamino-1-methyl-4-phenylpiperidine is obtained in its free base form, which can be isolated as such by removing the benzene from the reaction mixture by distilling in vacuo, or, alternatively, in the form of its hydrochloride addition salt by treating the benzene reaction mixture with hydrogen chloride, either in gaseous form or in ethanolic or ethereal solution, and collecting the resulting precipitate.

We claim:
1. A member of the group consisting of a compound having the formula

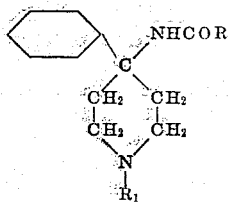

where R is a lower alkyl radical having from 1 to 5 carbon atoms inclusive and $R_1$ is a lower alkyl radical having from 1 to 6 carbon atoms inclusive, and acid addition salts thereof.

2. A compound having the formula

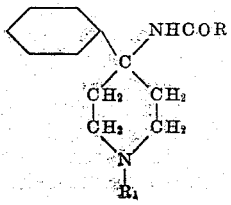

where R is a lower alkyl radical having from 1 to 5 carbon atoms inclusive and $R_1$ is a lower alkyl radical having from 1 to 6 carbon atoms inclusive.

3. An acid addition salt of the compound of claim 2.

4. 4-acetylamino - 1 - methyl-4-phenylpiperidine.

5. An acid addition salt of the compound of claim 4.

6. 4-acetylamino - 1 - methyl-4-phenylpiperidine hydrochloride.

7. In a process of preparing a compound having the formula

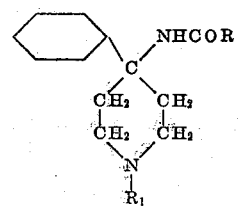

where R is a lower alkyl radical having from 1 to 5 carbon atoms inclusive and $R_1$ is a lower alkyl radical having from 1 to 6 carbon atoms inclusive, the step which comprises heating the corresponding 4 - amino - 1 - (lower alkyl) -4-phenylpiperidine with a lower alkanoylating agent.

8. The process of preparing a hydrohalide of a compound having the formula

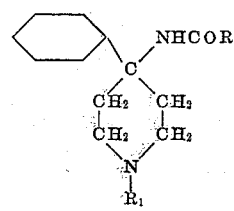

where R is a lower alkyl radical having from 1 to 5 carbon atoms inclusive and $R_1$ is a lower alkyl radical having from 1 to 6 carbon atoms inclusive, which comprises heating the corresponding 4-amino-1-(lower alkyl)-4-phenylpiperidine with a lower alkanoyl halide.

9. The process of preparing 4-acetylamino-1-methyl-4-phenylpiperidine hydrochloride which comprises heating 4-amino-1-methyl-4-phenylpiperidine with acetyl chloride.

CHARLES E. KWARTLER.
PHILIP LUCAS.

REFERENCES CITED

The following references are of record in the file of this patent:

UNITED STATES PATENTS

| Number | Name | Date |
|---|---|---|
| 2,538,107 | Kwartler et al. | Jan. 16, 1951 |